United States Patent
Stiers

(10) Patent No.: US 7,614,607 B2
(45) Date of Patent: Nov. 10, 2009

(54) DRAIN CONNECTOR FOR SUBSTANCE PROCESSING RECEPTACLE

(75) Inventor: Sven Stiers, Wange (BE)

(73) Assignee: ATMI Packaging N.V., Hoegaarden (BE)

( * ) Notice: Subject to any disclaimer, the term of this patent is extended or adjusted under 35 U.S.C. 154(b) by 571 days.

(21) Appl. No.: 11/522,679

(22) Filed: Sep. 18, 2006

(65) Prior Publication Data
US 2007/0102450 A1   May 10, 2007

Related U.S. Application Data

(60) Provisional application No. 60/718,466, filed on Sep. 19, 2005.

(51) Int. Cl.
*F16K 31/00* (2006.01)
(52) U.S. Cl. ........................ 251/340; 251/353
(58) Field of Classification Search ............... 251/340, 251/349, 353, 354, 153, 154, 155, 156
See application file for complete search history.

(56) References Cited

U.S. PATENT DOCUMENTS

| | | | | | |
|---|---|---|---|---|---|
| 2,692,112 | A | * | 10/1954 | Szitar | 251/354 |
| 2,842,382 | A | * | 7/1958 | Franck | 251/149.4 |
| 3,219,278 | A | * | 11/1965 | Santarelli | 251/353 |
| 4,413,806 | A | | 11/1983 | Anderson | |
| 4,801,124 | A | | 1/1989 | Liebel | |
| 5,775,541 | A | * | 7/1998 | Perkins | 222/105 |
| 6,705,591 | B2 | * | 3/2004 | deCler | 251/340 |
| 6,749,808 | B1 | | 6/2004 | Huynen et al. | |
| 7,083,323 | B2 | | 8/2006 | Zambaux | |
| 2005/0078552 | A1 | | 4/2005 | Zambaux | |

* cited by examiner

*Primary Examiner*—John Bastianelli
(74) *Attorney, Agent, or Firm*—Vincent K. Gustafson; Intellectual Property/Technology Law; David M. Shofi

(57) ABSTRACT

A selectively closeable drain connector includes a hollow plunger moveable relative to an aperture-defining drain flange. The connector includes two circumferential seals between the plunger and the flange, and includes at least one passage disposed between the seals leading to a hollow interior. The drain connector may be joined to a processing bag and/or tank to form a substance processing receptacle.

32 Claims, 9 Drawing Sheets

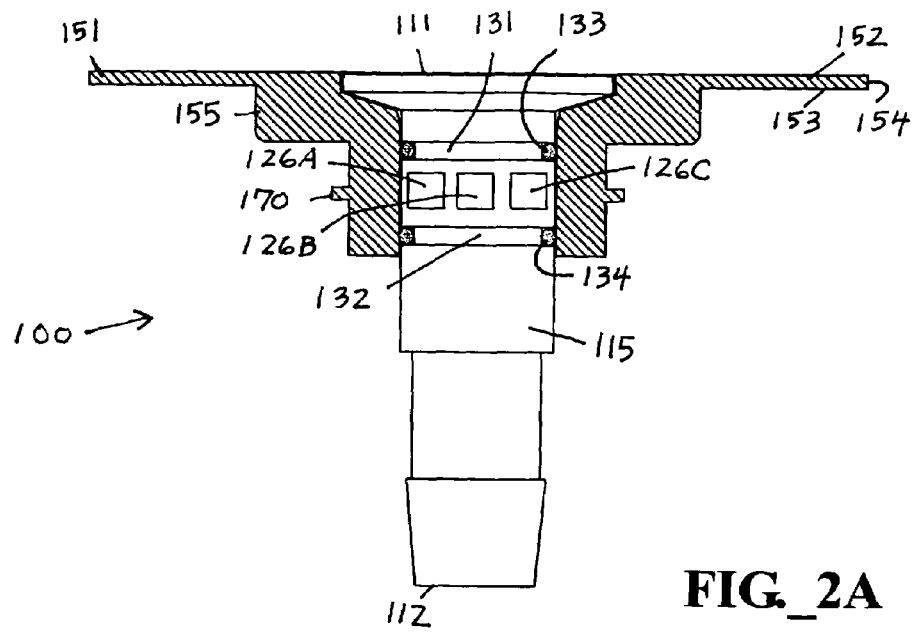
FIG._2A
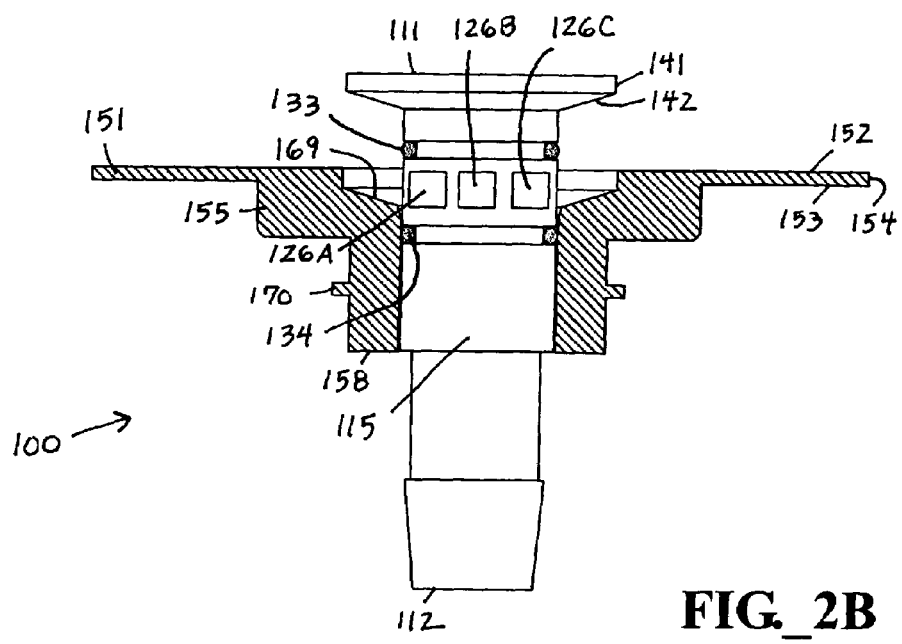
FIG._2B

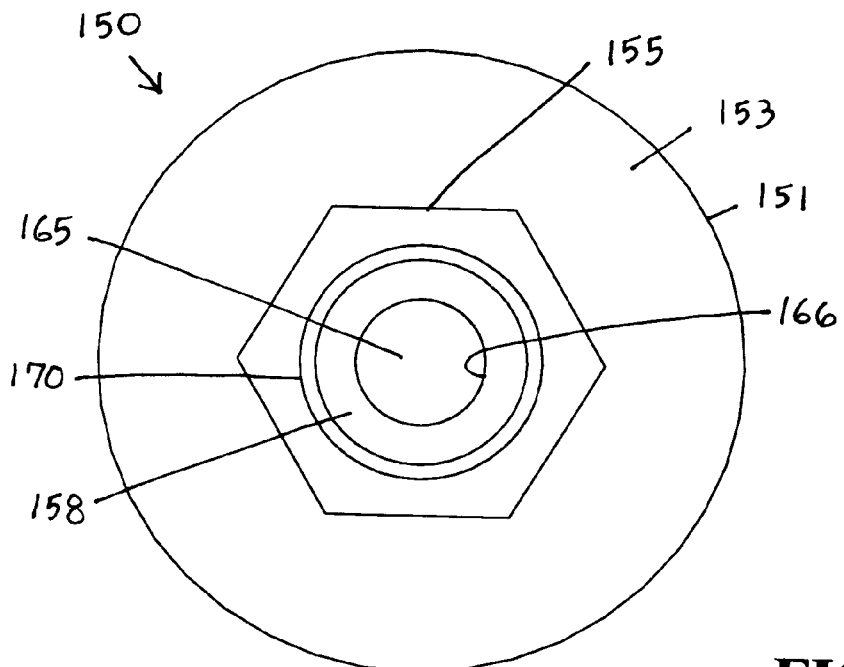
FIG._3A
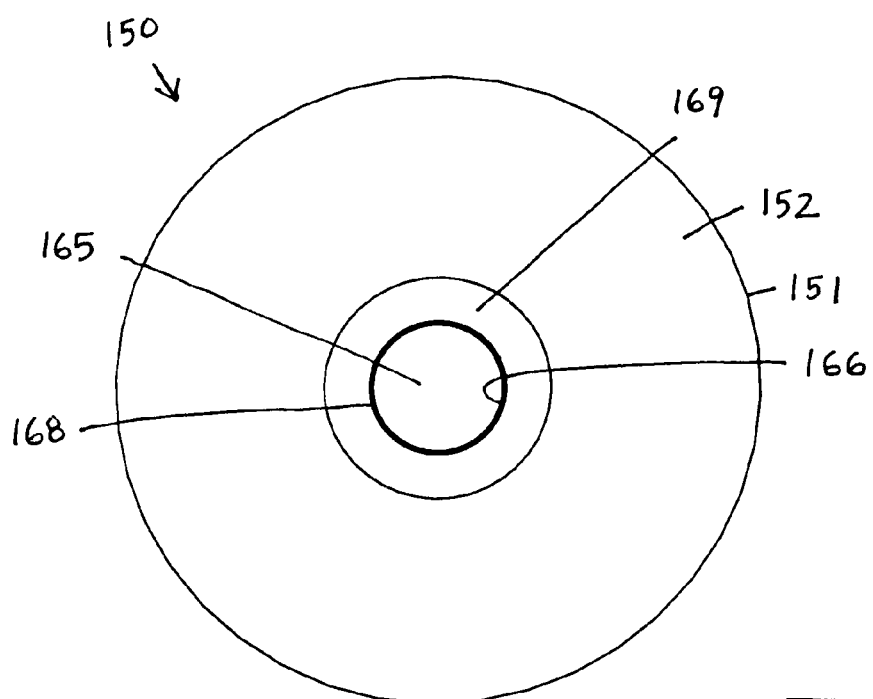
FIG._3B

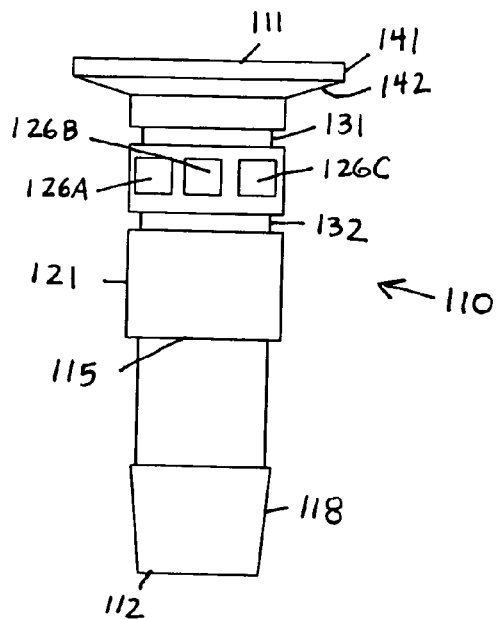
FIG._4A
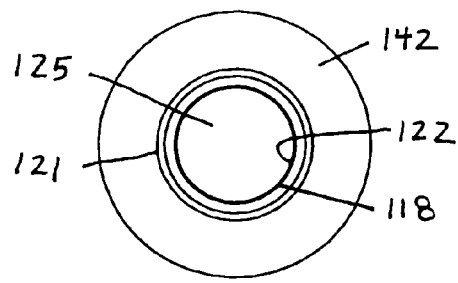
FIG._4B
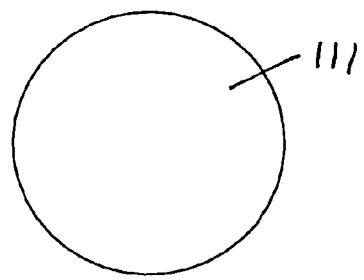
FIG._4C
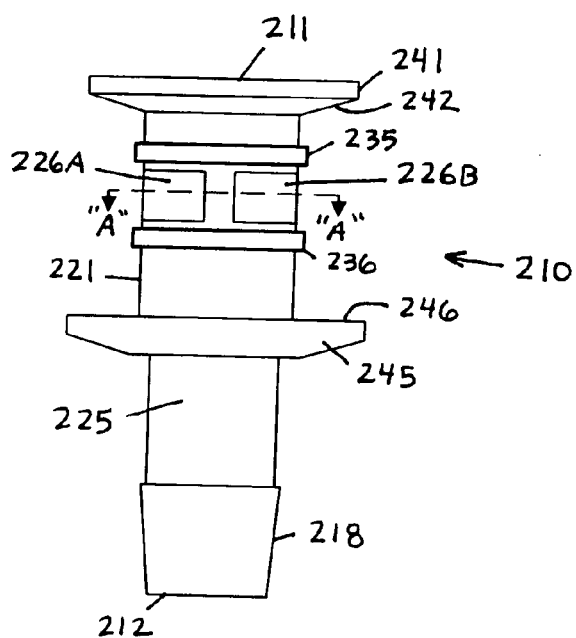
FIG._5A
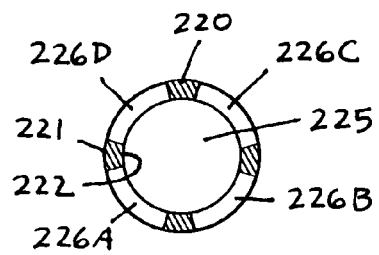
FIG._5B
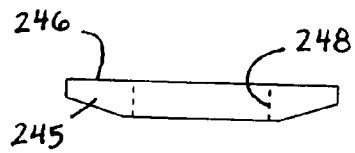
FIG._5C

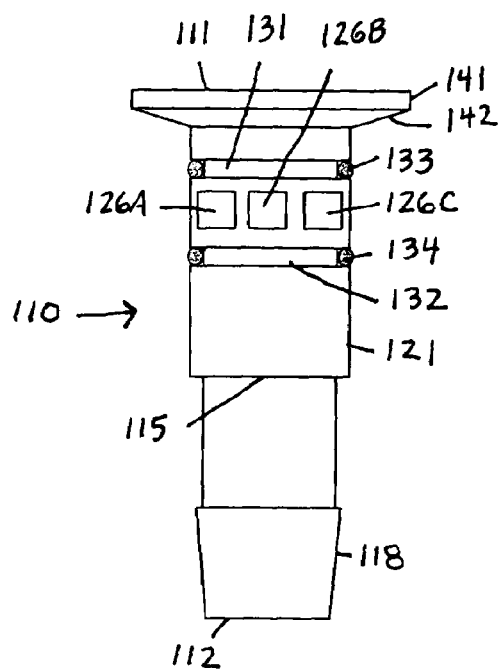
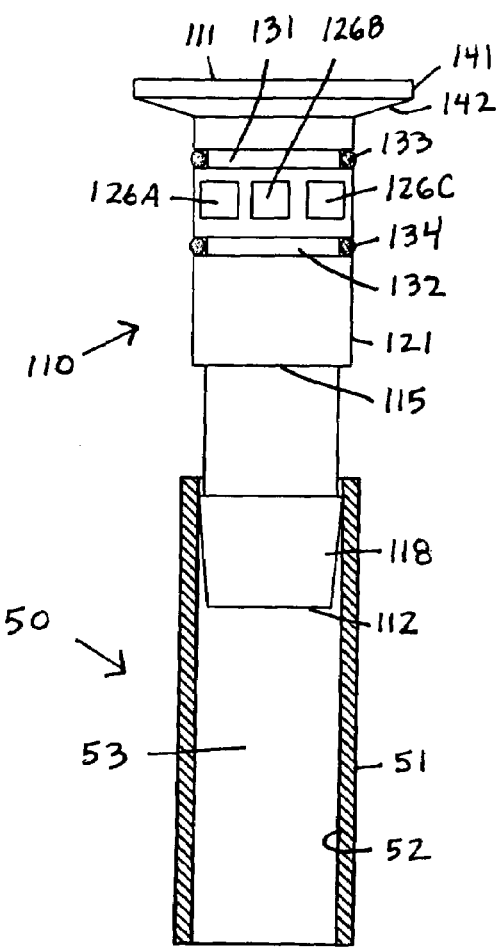
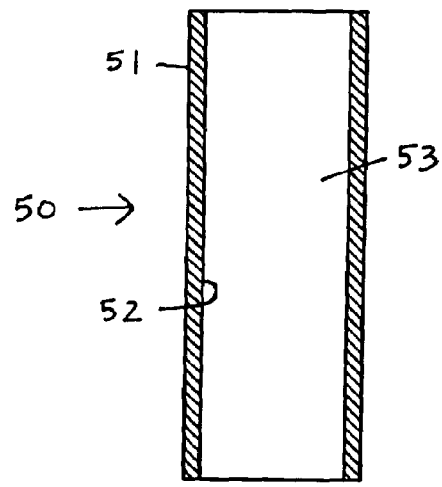
FIG._6A  FIG._6B

DRAIN CONNECTOR FOR SUBSTANCE PROCESSING RECEPTACLE

CROSS-REFERENCE TO RELATED APPLICATION

The present application claims priority to U.S. Provisional Patent Application No. 60/718,466 filed on Sep. 19, 2005 and entitled "DRAIN CONNECTOR FOR SUBSTANCE PROCESSING RECEPTACLE."

FIELD OF THE INVENTION

The present invention relates to substance processing receptacles and drain connectors therefor, including receptacles used for the processing (e.g., mixing and/or reacting) of various substances in laboratory and industrial settings.

DESCRIPTION OF THE RELATED ART

Mixing and/or reacting of components, such as different types of solids, liquids and/or gases, has numerous applications in different industries. For example, in the pharmaceutical industry, different types of drug precursor materials and/or therapeutic agents are mixed and/or reacted. In the medical field, components such as body fluids and/or drugs are mixed and/or reacted. In the semiconductor field, wet solutions are combined with abrasives to make slurries. The food industry also incorporates mixing operations into a number of applications, including the mixing of water with dried food to accomplish rehydration.

In these and other industries, however, the components to be mixed or reacted may be hazardous, dangerous, infectious and/or require high levels of purity. For example, in the pharmaceutical and/or medical industries, components subject to mixing or reacting operations may be toxic. In the medical field, fluids to be processed may contain live viruses (e.g., HIV) or other pathogens, justifying the need for individuals to avoid contact with such fluids. Furthermore, in the semiconductor industry, handling of chemicals is avoided to reduce the potential for forming particulates and introducing impurities. For these reasons, it is desirable to accomplish mixing or reacting steps in sealed substance processing assemblies fabricated with non-reactive materials.

In substance processing assemblies, it is important to minimize dead volumes (stagnant regions where unmixed components can avoid agitation) for a number of reasons. A first reason to minimize dead volume is to promote thorough or high quality mixing, which is critical to certain applications such as pharmaceutical formulation. Another reason to avoid dead volumes is to reduce the potential for sedimentation of solids. Dead volumes located in or near drain connectors are particularly problematic, since they can lead to undesirable contamination or carryover between processing batches, or if solids are involved then sedimentation can cause clogs or other draining problems that detrimentally affect system reliability.

Conventional systems for mixing and/or reacting substances utilize reusable tanks fabricated from materials such as glass or stainless steel, and associated agitation means. Prior to use, these tanks typically must be washed and sterilized. An autoclave may be used for washing and sterilizing small volume tanks, while a water steam-based operation may be employed for washing and sterilizing larger volume tanks. When preparing batches of post-etch residue removers for semiconductor applications, introduction of contaminants must be excluded at all levels of processing to decrease particulate formation, which leads to failure of finished semiconductor devices. These washing, sterilizing, and processing operations are often time-consuming and expensive, and require highly qualified individuals for their performance.

Drain connectors used with conventional mixing systems are reusable, and typically include a drain tube leading from the tank to a valve or other sealing means. The drain tube represents a dead volume that can inhibit complete mixing and/or permit sedimentation of solids. The above-mentioned washing, sterilizing, and processing operations may be performed with a drain connector in place, but without certainty that the drain connector is absolutely free of contaminants. Alternatively, the drain connector may be disassembled and separately cleaned or sterilized between mixing batches, but at the expense of substantial effort and delay.

In consequence, the art continues to seek improvement in mixing assemblies and their associated drain connectors. It would be desirable to provide a low dead volume drain connector for a mixing assembly. It would be desirable for a drain connector to be suitable for fitment to various different types of mixing assemblies. It would be desirable to be able to determine the presence or monitor characteristics of substances within a drain connector. It would also be desirable for the drain connector to be sufficiently simple and inexpensive to make it cost-effective to be disposed after a single use if desired so as to avoid contamination or carryover problems. It would also be desirable for a drain connector to be sterilizable together with an associated mixing assembly.

SUMMARY OF THE INVENTION

In one embodiment, a selectively closeable drain connector includes a hollow plunger and a drain flange defining an aperture adapted to receive the plunger, wherein any of the plunger and the flange is adapted to move relative to the other. The plunger includes an open end, a closed end, a hollow core, two circumferential sealing elements, and at least one passage disposed between the two sealing elements and extending from the exterior surface into the hollow core. The drain flange aperture is bounded by an inner surface adapted to sealingly engage the first and second circumferential sealing element when the drain connector is in a closed state, and to sealingly engage the second circumferential sealing element when the drain connector is in an open state.

In another embodiment, a fluid processing receptacle includes any of a hollow tank and a hollow bag fabricated of polymeric materials, and a selectively closeable drain connector joined to any of the tank and the bag, with the drain connector including a hollow plunger and a drain flange defining an aperture adapted to receive the plunger, wherein any of the plunger and the flange is adapted to move relative to the other. The plunger includes an open end, a closed end, hollow core, two circumferential sealing elements, and multiple passages disposed between the two sealing elements and extending from the exterior surface into the hollow core. The drain flange aperture is bounded by an inner surface adapted to sealingly engage the first and second circumferential sealing element when the drain connector is in a closed state, and to sealingly engage the second circumferential sealing element when the drain connector is in an open state. Each of the plunger and the flange comprise polymeric materials.

In yet another embodiment, a method for fabricating a sterile mixing receptacle involves multiple method steps. A first method step includes providing any of a hollow mixing tank and a hollow mixing bag. A second method step includes providing a selectively closeable drain connector comprising a hollow plunger and a drain flange defining an aperture adapted to receive the plunger, with the plunger having a hollow core, two circumferential sealing elements and at least one passage disposed between the two sealing elements and extending from the exterior surface into the hollow core, with the drain flange aperture being bounded by an inner surface adapted to sealingly engage the first and second circumferential sealing element when the drain connector is in a closed state, wherein any of the plunger and the flange is adapted to move relative to the other, and to sealingly engage the second circumferential sealing element when the drain connector is in an open state. A third method step includes joining the drain connector to any of the mixing tank and the mixing bag to form a mixing receptacle. A fourth method step includes sterilizing the mixing receptacle to form the sterile mixing receptacle. An optional fifth method step includes packaging the sterile mixing receptacle in a sealed package.

In still another embodiment, a selectively closeable drain connector includes a hollow plunger and a drain flange defining an aperture adapted to receive the plunger and adapted to receive the plunger, wherein any of the plunger and the flange is adapted to move relative to the other. The plunger includes a plunger body having a closed end, an open end, a wall with an exterior surface and with an interior surface bounding a hollow core, and at least one passage extending from the exterior surface into the hollow core. The drain flange inner surface has a first and a second raised sealing element. When the drain connector is in a closed state, the (at least one) passage is disposed between the first and the second raised sealing element, and each sealing element sealingly engages the exterior surface of the plunger.

Other aspects, features and embodiments of the invention will be more fully apparent from the ensuing disclosure and appended claims.

BRIEF DESCRIPTION OF THE DRAWINGS

In the drawings, like numbers are intended to refer to like elements or structures. None of the drawings are drawn to scale unless indicated otherwise.

FIG. 2A shows the drain connector of FIG. 1 in a closed state, with the plunger illustrated in elevation view, and with the drain flange and circumferential sealing O-rings illustrated in cross-sectional view.

FIG. 2B illustrates the same views as FIG. 2A, but with the drain connector in an open state.

FIG. 3A is a bottom view of the drain flange shown in FIG. 1 and FIG. 2A-2B.

FIG. 3B is a top view of the drain flange of FIG. 3A.

FIG. 4A is an elevation view of the plunger of FIG. 1 and FIGS. 2A-2B.

FIG. 4B is a bottom view of the plunger of FIG. 4A.

FIG. 4C is a top view of the plunger of FIGS. 4A-4B.

FIG. 5A is an elevation view of a hollow plunger of a drain connector according to a second embodiment of the present invention.

FIG. 5B is a cross-sectional view of a portion of the plunger of FIG. 5A taken along section lines "A"-"A" illustrated in FIG. 5A, the plunger including a lower travel stop element.

FIG. 5C is an elevation view of the travel stop element of FIG. 5B, with the interior voids within the travel stop represented in shadowed lines.

FIG. 6A shows the plunger of FIGS. 2A-2B proximate to a separate outlet tube, with the plunger shown in elevation view and with the outlet tube and two circumferential sealing O-rings shown in cross-sectional view.

FIG. 6B illustrates the same views as FIG. 6B, but with the outlet tube joined to the plunger.

DETAILED DESCRIPTION OF THE INVENTION, AND PREFERRED EMBODIMENTS THEREOF

The disclosures of the following patents/applications are hereby incorporated by reference as if set forth herein: U.S. Pat. No. 6,749,808 entitled "Sterilizable container with a sterilizable adapter for docking to a port of an isolation system;" U.S. Patent Application Publication No. 2005/0078552 entitled "Flexible mixing bag for mixing solids, liquids and gases;" and U.S. Patent Application Publication No. 2004/0233779 entitled "Flexible mixing bag for mixing solids, liquids and gases," each of which are commonly assigned to the assignee of the present application.

Various shortcomings associated with processing receptacles employing conventional drain connectors are overcome by embodiments of the present invention. For example, dead volumes may be reduced by positioning a closeable drain connector proximate to the drain receptacle, thus avoiding the use of a remotely located valve separated from the receptacle by a drain tube.

Components of a drain connector 100 according to a first embodiment of the present invention are shown in FIGS. 1, 2A-2B, 3A-3B and 4A-4C, with the drain connector 100 showed in two states of operation in FIGS. 2A-2B.

Figure 1:
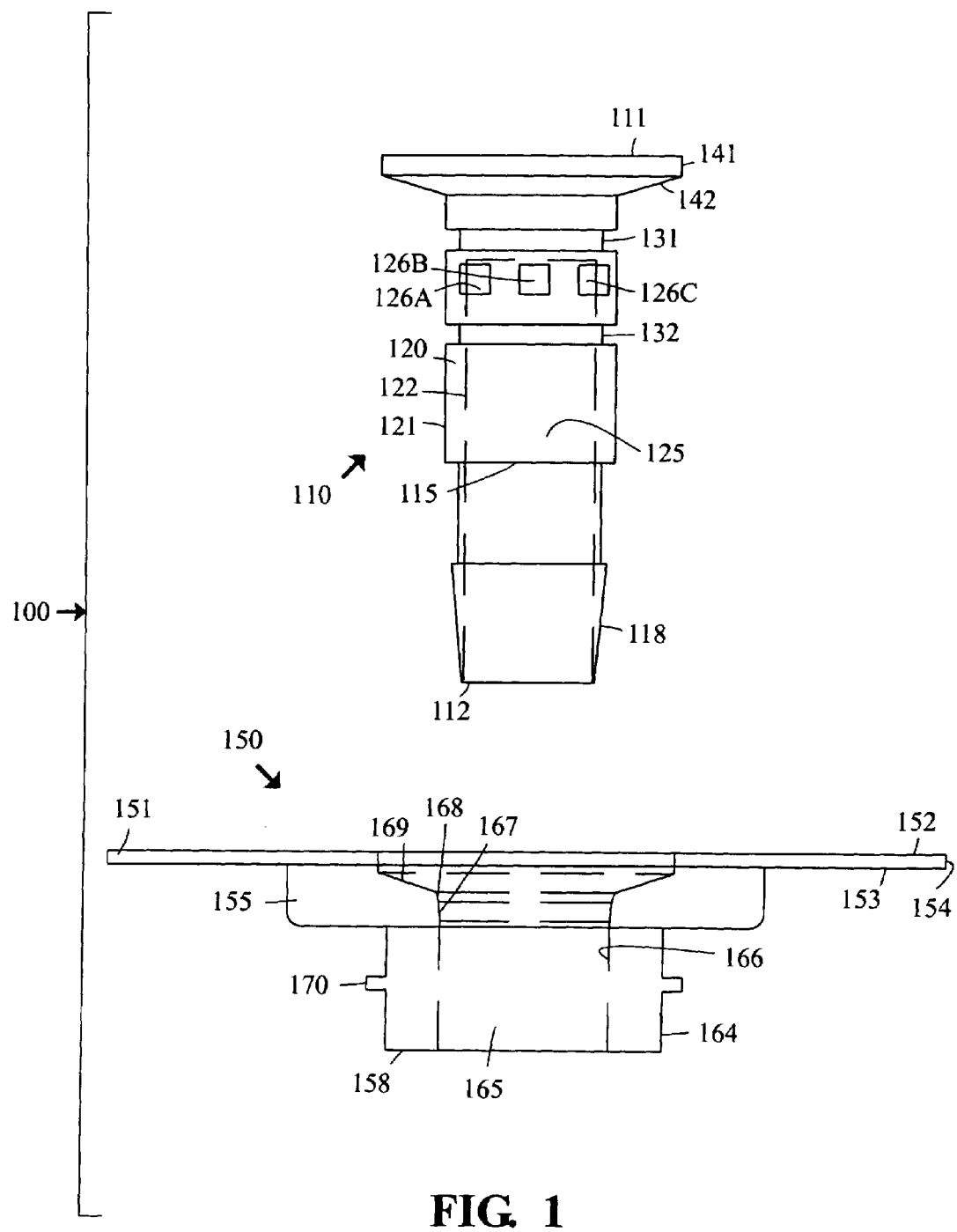
FIG. 1 is an exploded elevation view of a hollow plunger and drain flange of a drain connector according to a first embodiment of the present invention, with interior voids within the plunger and drain represented in shadowed lines.

FIG. 1 is an exploded elevation view of a hollow plunger and drain flange of a drain connection according to a first embodiment of the invention. The drain connector 100 includes a hollow plunger 110 that is moveable relative to and within a drain flange 150. The plunger 110 has a body 115 (which may be tubular in shape), a first closed end 111, and a second open end 112, and a wall 120 with an exterior surface 121 and an interior surface 122 defining a hollow core 125 leading or open to the open end 112. Multiple passages 126A-126C are defined through the wall 120 and extend from the exterior surface 121 into the hollow core 125. The exterior surface 121 of the wall 120 further defines two circumferential recesses 131, 132 adjacent to the passages 126A-126C. Specifically, the passages 126A-126C are disposed between the recesses 131, 132, with the recesses 131, 132 being sized to retain O-rings 133, 134, respectively, to provide sealing utility between the plunger 110 and an inner surface 166 of the flange 150.

Continuing to refer to FIG. 1, the first closed end 111 of the plunger 110 includes a flared portion 141 that serves as a travel stop for the plunger 110 when it moves (e.g., downward) into the aperture 165 of the flange 150. The flared portion or travel stop 141 includes an outer tapered surface 142 sized and shaped to mate against a corresponding inner tapered surface 169 of the flange 150. At the opposite end of the plunger 110, the body 115 preferably includes a tapered neck portion 118 intended to mate with an outlet tube (such as the tube 50 illustrated in FIGS. 6A-6B).

Continuing to refer to FIG. 1, the flange 150 includes a flange lip 151 having an upper surface 152, a lower surface 153, and a peripheral edge 154. The flange lip 151 extends outward from the flange body 155, which is preferably hexagonal in shape, as shown in FIG. 3A. The flange body 155 defines an aperture 165 bounded by an inner surface 166 and tapered upper surface portions 167-169, as shown in FIG. 3B. The lower portion of the inner surface 166 preferably has substantially constant interior dimensions to permit the plunger 110 to slide freely therein, with the O-rings 133, 134 contacting the inner surface 166. The flange body 155 includes an outer surface 164 with a retaining lip 170 protruding therefrom. The flange body 155 further includes a lower body surface 158 that is preferably annular in shape surrounding the aperture 165.

FIG. 2A shows the drain connector of FIG. 1 in a closed state, with the plunger illustrated in elevation view, and with the drain flange and circumferential sealing O-rings illustrated in cross-sectional view. FIG. 2B illustrates the same views as FIG. 2A, but with the drain connector in an open state—i.e., with the plunger 110 elevated relative to the drain flange 150 to open a fluid pathway through the passages 126A-126C into the hollow core 125.

FIG. 3A is a bottom view of the drain flange 150 shown in FIGS. 1 and 2A-2B, illustrating the flange lip 151, lower surface 153, flange body 155, lower body surface 158, aperture 165, inner surface 166, and retaining lip 170 all as described previously.

FIG. 3B is a top view of the drain flange 150 shown in FIGS. 1, 2A-2B, and 3A, illustrating the flange lip 151, the upper surface 152, the aperture 165, the inner surface 166, and the upper surface portion 168, all as described previously.

FIG. 4A is an elevation view of the plunger of FIG. 1 and FIGS. 2A-2B, illustrating the first closed end 111, the second open end 112, the exterior surface 121, the body 115, the tapered neck portion 118, the flared portion 141, the outer tapered surface 142, the O-ring recesses 131, 132, and the passages 126A-126C, all as described previously.

FIG. 4B is a bottom view of the plunger of FIG. 4A, illustrating the exterior surface 121, the interior surface 122, the hollow core 125, the tapered neck portion 118, and the outer tapered surface 142, all as described previously. FIG. 4C is a top view of the plunger of FIGS. 4A-4B, illustrating the first closed end 111.

While various materials and construction methods may be used to fabricate the plunger 110 and flange 150, preferred embodiments employ polymeric materials and are molded (e.g., injection-molded). Polyethylene materials including low- and high-density polyethylene are particularly preferred materials for fabricating the plunger 110 and flange 150. Substantially optically transmissive or transparent materials may desirably be used to form the plunger 110 and the flange 150 to permit the contents of the drain connector 100 to be viewed or inspected. Benefits of utilizing such materials include low fabrication cost, compatibility (e.g., non-reactivity) with a wide variety of substances used in industrial and laboratory settings, and amenability to being sterilized where required for certain applications. Low fabrication cost renders drain connectors as disclosed herein suitable for single- or disposable-use operation, thus eliminating costly cleaning/sterilizing operations and eliminating the possibility of carryover between batches. Each of the plunger 110 and the flange 150 preferably comprises a single piece, but may alternatively be constructed from multiple pieces if desired.

One or more sensors of various types may be incorporated into the flange and/or plunger to monitor at least one characteristic of a substance contained or flowing within the drain connector. Temperature, pH, conductivity, and pressure are examples of desirable characteristics of substances to be sensed or monitored with appropriate sensors.

While various embodiments disclosed herein illustrate plungers having perimeters that are substantially circular in shape, and likewise drain flange apertures that are substantially circular in shape, it is to be understood that such embodiments are intended to be illustrative only and the invention is not limited to particular shapes. Plungers and flanges having circular or oval shapes are preferred, but other shapes may be used.

While multiple passages 126A-126C are shown as being defined through the wall 120, a plunger 110 may only require a single passage. If desired, a multiplicity of passages 126A-126C may be defined through the wall 120 of any size suitable for an intended application. In one embodiment, the passages 126A-126C may be sized to provide straining or filtration utility. In another embodiment, the passages may be sized to permit air or other gases to be introduced from the plunger 110 into a suitable receptacle, such as to supply oxygen to biological moieties contained therein or to furnish gaseous reactants for a desired reaction. In this vein, the adjective "drain" as applied to the term "drain connector" herein is intended to refer to the ability of such a device to modulate flow, but without being limited to modulating flow in only one direction.

Two states of operation of the drain connector 100 are shown in FIGS. 2A-2B, with FIG. 2A showing the drain connector 100 in a closed state and FIG. 2B showing the drain connector 100 in an open state. When the drain connector 100 is in a closed state, the upper surface 111 of the first closed end is preferably substantially flush with the upper surface 152 of the drain flange 150. This minimizes any interference between the drain connector 100 and a mixing element or other agitation means disposed within a processing receptacle to which the drain connector 100 may be attached. When the drain connector 100 is in a closed state, the outer tapered surface 142 of the plunger 110 is mated against the corresponding inner tapered surface 169 of the flange, and both the first (upper) O-ring 133 and second (lower) O-ring 134 are sealingly engaged against the inner surface 166 of the drain flange 150. Such sealing engagement prevents the passage of any solids, liquids, or gases through the drain connector 100. Upward movement of the plunger 110 eliminates sealing engagement between the first (upper) O-ring 133 and the inner surface 166, thus exposing the passages 126A-126C and placing the drain connector 100 in an open state. Thus, substances located within a processing receptacle to which the drain connector 100 is attached may flow through the passages 126A-126C into the hollow core 125 and exit the receptacle (not shown). By providing a close fit between the upper portion of the plunger 110 and the flange 150, and by positioning both the upper and lower O-rings 133, 134 proximate to the passages 126-126C, dead volume in the drain connector is minimized.

An alternative hollow plunger 210 according to a second embodiment is shown in FIGS. 5A-5C. The plunger 210 has a body 215, a first closed end 211, a second open end 212, and a wall 220 with an exterior surface 221 and an interior surface 222 defining a hollow core 225 leading or open to the open end 212. Multiple passages 226A-226D are defined through the wall 220 and extend into the hollow core 225. As an alternative to recesses and O-rings, this plunger 210 includes protruding sealing rings 235, 236, with one ring 235 disposed above the passages 226A-226D and the other ring 236 disposed below the passages 226A-226D. In addition to having a flared portion 141 with surface 142 serving as a first travel stop, the plunger 210 further includes a second travel stop 245 that limits the outward or upward movement of the plunger 210 relative to an associated drain flange. The upper surface 246 of the second travel stop 245 is intended to contact the lower body surface 158 of the drain flange 150 shown in the preceding figures. The travel stop 245 may be integrally formed to the plunger 210, or, as shown in FIG. 5C, it may be formed as a separate element having an interior cavity 248 for mating with the exterior surface 221 of the plunger 210.

The joining of a plunger 110 with an outlet tube 50 is shown in FIGS. 6A-6B. An outlet tube having an outer wall 51 and an inner wall 52 defining a bore 53 may be fitted to the plunger 110 by inserting the tapered neck 118 into the tube 50. Various types of outlet tubes may be used, with silicone tubing being one preferred type. Sealing between the outlet tube 50 and the plunger 110 may be further assured with adhesive, or more preferably, with an external clamp or strap (not shown). The outlet tube 50 functions to conduct substances from (or alternatively, to) the hollow core 125 of the plunger 110. If desired, the outlet tube 50 may also be used to actuate the drain connector 100. With the outlet tube 50 joined to the neck 118 of the plunger 110, upward movement of the outlet tube 50 pushes the drain connector 100 into the open position as illustrated in FIG. 2B, while downward movement of the outlet tube 50 draws the drain connector into the closed position as illustrated in FIG. 2A. Alternatively, conventional actuating elements such as levers, rods, solenoids, or other actuators may be used to cause the drain connector 100 to cycle between the open and closed positions.

Figure 7A:
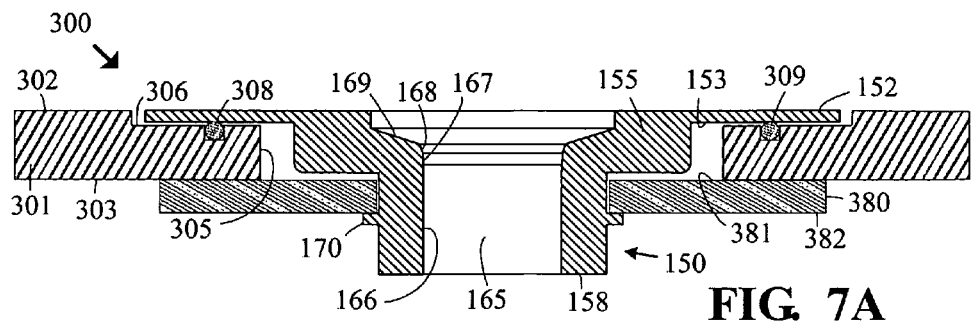
FIG. 7A provides a cross-sectional view of the drain flange of FIGS. 2A-2B removably joined to a processing tank to form a portion of a processing receptacle according to another embodiment of the present invention.

In further embodiments, various types of fluid processing receptacles include drain connectors as provided herein in conjunction with processing tanks and/or bags. FIG. 7A illustrates a portion of a first fluid receptacle 300 including a processing tank 301 (with only a lower portion of the tank 301 being illustrated). The tank 301 has an inner surface 302, an outer surface 303, and defines an aperture 305 for receiving a drain flange 150. (While not illustrated in FIG. 7A to promote clarity, it is to be understood that a hollow plunger 110 or 210 as disclosed herein would be provided in conjunction with the drain flange 150 to form a drain connector 100). The tank 301 further defines a shallow recess 306 for accepting the flange lip 151, and a narrower but deeper recess 308 for holding an O-ring 309 to promote sealing between the flange 150 and the tank 301. Compressive contact between the flange 150 and the tank 301 is maintained by way of a retaining element 380 engaging the retaining lip 170 protruding from the flange body 155. Specifically, the lower surface 382 of the retaining element 380 engages the retaining lip 170, while the upper surface 383 of the retaining element 380 engages the lower surface 303 of the tank 301, thus exerting a downward force on the flange 150 that compresses the flange lip 151 against the O-ring 309. Removal of the retaining element 380 permits the flange 150 to be separated from the tank 301 if desired. The use of such a retaining element 380 permits the drain connector 100 to be used with and easily installed in a wide variety of different types of processing tanks.

Figure 7B:
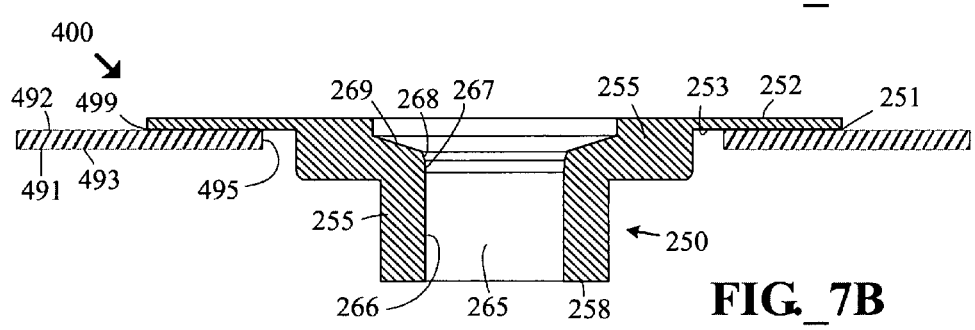
FIG. 7B provides a cross-sectional view of a drain flange similar to the flange shown in FIGS. 2A-2B permanently joined to a processing bag to form a portion of a processing receptacle according to another embodiment of the present invention.

In another embodiment, a drain connector may be joined to a processing bag fabricated of substantially non-rigid materials to form a processing receptacle. FIG. 7B illustrates a receptacle 400 having a drain connector including a drain flange 250 permanently joined to a non-rigid processing bag 491. The bag 491, which has an inner surface 492 and an outer surface 493 and defines an aperture 495 for receiving the drain connector, is preferably constructed with a polymeric film such as high-density or low-density polyethylene. The drain flange 250 is substantially similar to the drain flange 150 disclosed previously herein, but with the omission of any retaining lip. The drain flange 250 includes a flange lip 251 having an upper surface 252 and a lower surface 253, and a flange body 255 defining an aperture 265 bounded by an inner surface 266 and tapered surface portions 267-269. A lower body surface 258 provides the lower boundary of the flange 250 and surrounds the aperture 265. The flange 250 may be joined to the bag 491 along by any appropriate means, such as ultrasonic welding, solvent welding, thermal bonding, and adhesive bonding. The interface between the inner surface 492 of the bag 491 and the lower surface 253 of the flange lip 251 forms a joint 499. One advantage of joining the drain connector/drain flange 250 to the processing bag 491 to form a processing receptacle is that the receptacle can be sterilized as a combined assembly, and then packaged together following sterilization in a sealed package. This ensures sterile conditions are maintained during transport and minimizes the chance of contamination when the receptacle is readied for first use. The receptacle is particularly well-suited for disposable operation. If desired, the bag may be structurally supported within a rigid tank or a substantially open frame with appropriate hooks or other fasteners (not shown).

Figure 7C:
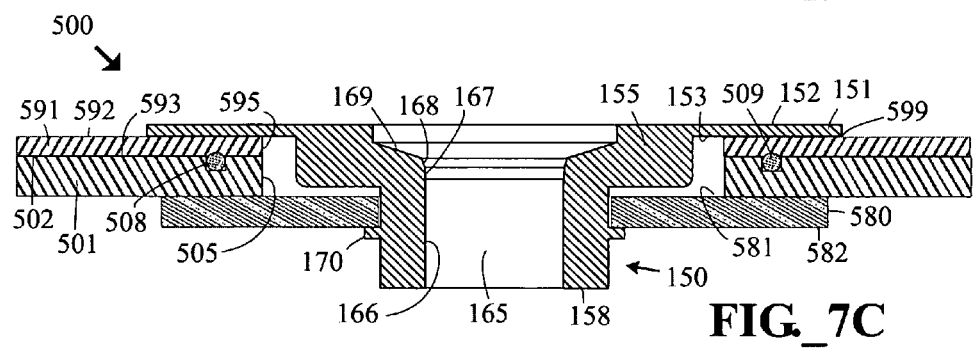
FIG. 7C provides a cross-sectional view of the drain flange of FIGS. 2A-2B joined to a processing bag, with the bag removably fitted into a processing tank, to form a portion of a processing receptacle according to another embodiment of the present invention.

A processing receptacle according to another embodiment including a processing tank, a processing bag, and a drain connector is illustrated in FIG. 7C. The receptacle 500 includes a processing bag 591 having a drain flange 150 joined thereto, with the bag 591 being supported by a tank 501 that also provides secondary containment utility in case the bag 591 should rupture. In one embodiment, the bag 591 is permanently joined to the drain flange 150, such as by ultrasonic welding. In another embodiment, the bag 591 is compressed between the drain flange 150 and the tank 501 without being permanently joined thereto, so as to permit the drain flange 150 to be re-used with different disposable bag 591. An aperture 505, 595 is defined in each of the tank 501 and bag 591 to receive the flange 150. The bag 591 has an outer surface 593 and an inner surface 592 joined to the lower surface 153 of the flange lip 151 to form a joint 599. The lower surface 593 of the bag 591 is disposed against the inner surface 502 of the tank 501, with the tank 501 further defining a recess 508 containing an O-ring 509 to promote sealing between the tank 501 and the bag 591. Compression of the bag 591 against the tank 501 is maintained by the retaining element 580, which engages the retaining lip 170 protruding from the flange body 155. Such compression may be used in conjunction with the O-ring 509 to maintain sealing engagement between the drain flange 150 and the bag 591. Specifically, the lower surface 582 of the retaining element 580 engages the retaining lip 170, while the upper surface 581 of the retaining element 580 engages the lower surface 503 of the tank 501, thus exerting a downward force on the flange 150 that compresses the flange lip 151 and the lower surface 593 of the bag 591 against the O-ring 509. In this manner, a disposable processing bag 591 with the associated drain connector/drain flange 150 may be used with a rigid mixing tank 501 such that the mixing tank need not be re-used or re-sterilized between batches.

Figure 7D:
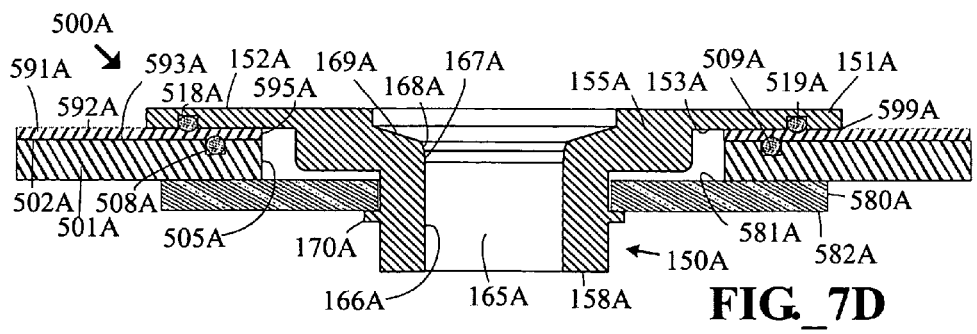
FIG. 7D provides a cross-sectional view of the drain flange similar to the flange shown in FIGS. 2A-2B non-permanently joined to a processing bag, with the bag removably fitted into a processing tank, to form a portion of a processing receptacle according to another embodiment of the present invention.

A processing receptacle according to another embodiment including a processing tank, a processing bag, and a drain connector is illustrated in FIG. 7D. The receptacle 500A closely resembles the receptacle 500 illustrated in FIG. 7C, with the addition of a second O-ring 519A between the drain flange 150A and the bag 591A, with a slightly thicker drain flange 150A to accommodate such O-ring 519A, and with a slightly thinner bag 591A. In the present embodiment, the bag 591A is not permanently joined to the drain flange 150A. The bag 591A is supported by a tank 501A providing secondary containment utility. An aperture 505A, 595A is defined in each of the tank 501A and the bag 591A to receive the drain flange 150A. The bag 591A has an outer surface 593A and an inner surface 592A joined to the lower surface 153A of the flange lip 151A to form a joint 599A. The lower surface 153A of the drain flange 150A further defines a recess 518A for receiving an O-ring 519A adapted to provide a seal between the drain flange 591A and the bag 591A. The lower surface 593A of the bag 591A is disposed against the inner surface 502A of the tank 501A, with the tank 501A further defining a recess 508A containing another O-ring 509 to promote sealing between the tank 501A and the bag 591A. Compression of the bag 591A against the tank 501A is maintained by the retaining element 580A, which engages the retaining lip 170A protruding from the flange body 155A. Such compression may be used in conjunction with both O-rings 509A, 519A to maintain sealing engagement between the tank 501A and the bag 591A, and between the bag 591A and the drain flange 150A. Specifically, the lower surface 582A of the retaining element 580A engages the retaining lip 170A, while the upper surface 581A of the retaining element 580A engages the lower surface 503A of the tank 501A, thus exerting a downward force on the flange 150A that compresses both O-rings 509A, 519A against the respective surfaces 592A, 593A of the bag 591A. In this manner, a disposable processing bag 591A with the associated drain connector/drain flange 150A may be used with a rigid mixing tank 501A such that the mixing tank need not be re-used or re-sterilized between batches. The drain flange 150A may be re-sterilized and re-used with another mixing bag/mixing tank assembly if desired.

As an alternative to using a drain connector having a plunger with circumferential seals to mate with an inner surface of a drain flange, the inner surface of the drain connector may include raised sealing elements. In such an embodiment, a selectively closeable drain connector includes a moveable hollow plunger with a plunger body having a first closed end, a second open end, and a wall with an exterior surface and with an interior surface bounding a hollow core. The plunger body defines at least one passage extending from the exterior surface into the hollow core. The drain flange defines an aperture bounded by an inner surface and adapted to receive the plunger, with the inner surface having a first and a second raised sealing element. When the drain connector is in a closed state, the at least one passage is disposed between the first and the second raised sealing element, and each of the first and the second raised sealing element sealingly engage the exterior surface of the plunger.

Figure 8:
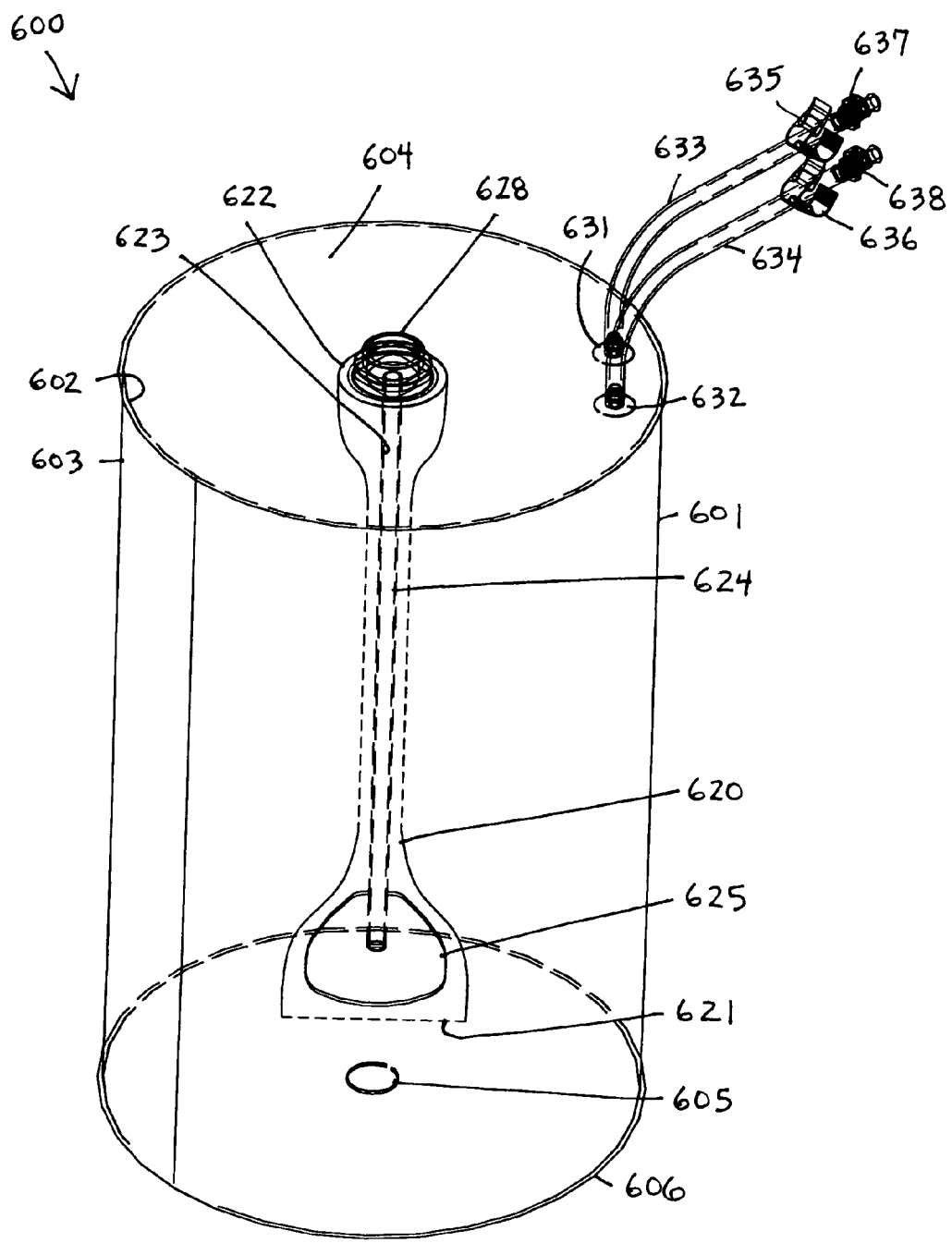
FIG. 8 is a perspective view of a processing tank or bag for use with a drain connector according to the present invention, the tank or bag having a hollow sleeve containing a mixing element and a connecting rod, with features interior to the tank or bag represented in shadowed lines.

A tank or bag (referred to hereinafter as a tank 601 with the understanding that the tank 701 may refer to either a tank or bag) for use with a drain connector as described herein is illustrated in FIG. 8. The tank 601 includes a side wall 603 joined to top wall 604 at seam 602. The tank 601 includes a cavity-defining sealed sleeve 620 joined to (e.g., the top 604 of) the tank 601 and protruding into the tank 601. The cavity 623 contains a mixing paddle 625 and support rod 624. The function of the sleeve 620 is to serve as an isolation barrier between the mixing elements 624, 625 and the interior of the tank 601. If desired, the sleeve 620 may be fabricated from a polymer film with a lower seam 621 provided after the mixing elements 624, 625 are inserted into the sleeve 620, such that any of the mixing elements 624, 625 may be permanently retained by the sleeve 620. The sleeve 620 may include a reinforced aperture-defining coupling guide 628 to permit the support rod 624 to be inserted into the sleeve 620 and/or permit an external mixing mechanism (not shown) to be coupled to the support rod 624 while resisting puncture or damage of the sleeve 620. In operation, the paddle 625 and rod 624 contained within the sleeve 620 are preferably directed in a circular, oval, or other appropriate path within the tank 601 to stir or mix substances contained therein.

An upper seam 622 preferably joins the sleeve 620 to the upper wall 604 of the tank 601, with the sleeve 620 preferably permanently joined to the tank 601. Both the tank 601 and sleeve 620 preferably comprise polymeric materials suitable for economical single use (i.e., disposable) operation. In one embodiment, each of the tank 601 and sleeve 620 comprises a polymeric film; in a particularly preferred embodiment, each of the tank 601 and sleeve 620 comprises a substantially optically transmissive or transparent film. If desired, a substantially open external frame (not shown) may be provided to support the tank 601 with associated hooks or connectors (not shown). The upper wall of the tank further defines apertures 631, 632 serving as access ports for the admission of substances into the tank 601. Each aperture or port 631, 632 preferably has an associated supply line 633, 634, sealing element 635, 636, and coupling element 637, 638. The lower wall 606 of the tank 601 defines an aperture 605 adapted to receive a drain connector flange (such as any of the flanges 150, 250 described herein), which may be joined to the tank 601 by any appropriate means. The combination of the tank 601 and flange 150, 250 may be called a processing receptacle 600, similar to the receptacles 300, 400, 500, 500A shown in FIGS. 7A-7D.

Figure 9:
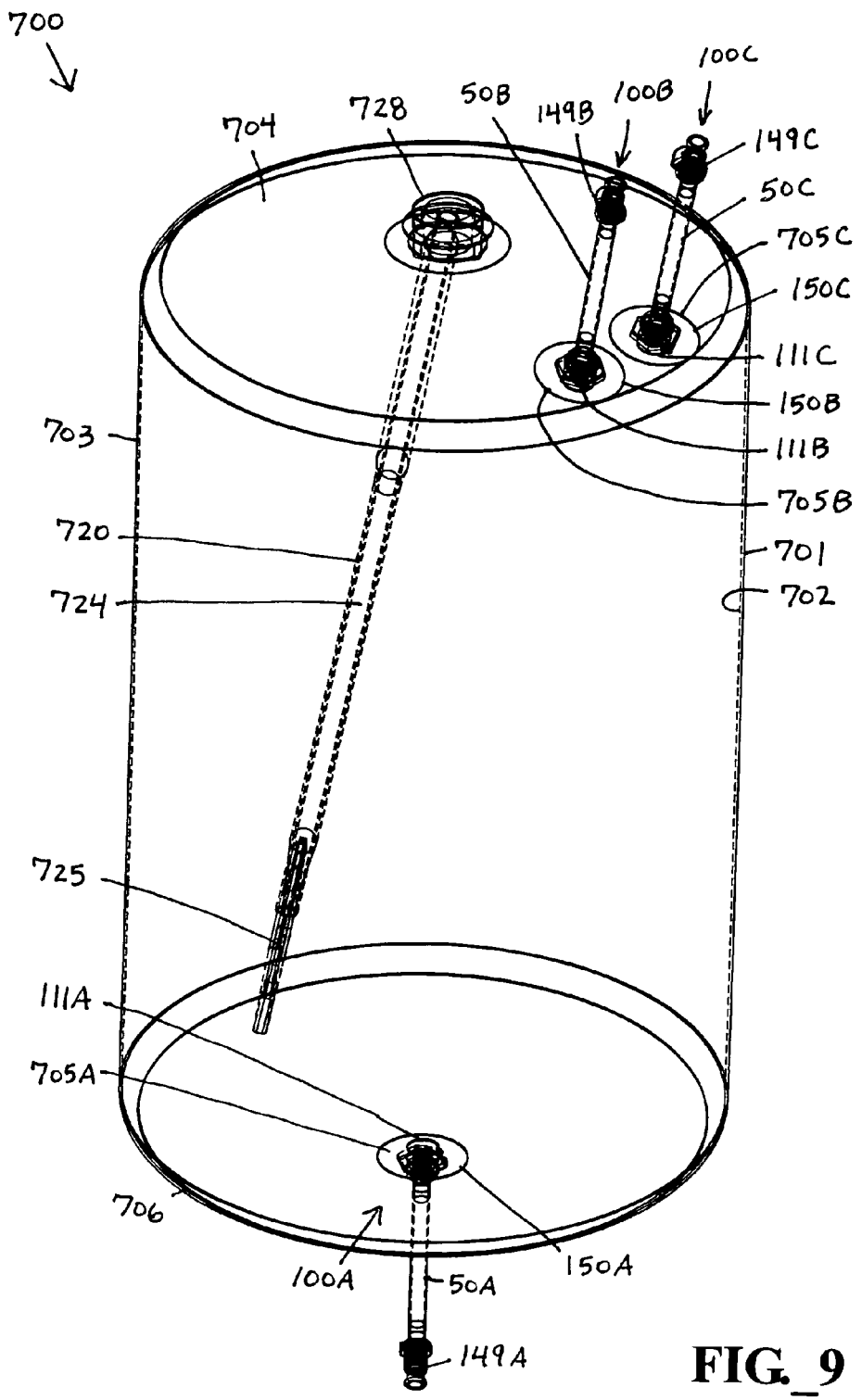
FIG. 9 is a perspective view of a processing tank or bag with three drain connectors according to the present invention and with a hollow sleeve containing a mixing element and a connecting rod, with features internal to the various external structures represented in shadowed lines.

Another tank or bag (referred to hereinafter as a tank 701 with the understanding that the tank 701 may refer to either a tank or bag) to which three drain connectors 100A, 100B, 100C (preferably identical or substantially similar to the drain connector 100 as provided herein) are coupled is illustrated in FIG. 9. The tank 701 has an upper surface 704, a lower surface 706, an outer wall 703 and an inner wall 702. The tank 701 further includes a cavity defining sealed sleeve 720 joined to the top 704 of the tank 701 and protruding into the tank 701. The sleeve contains a mixing paddle 725 and support rod 724. The function of the sleeve 720 is to serve as an isolation barrier between the mixing elements 724, 725 and the interior of the tank 701. The paddle 725 and rod 724 contained within the sleeve 725 are preferably directed in a circular, oval, or other appropriate path within the tank 601 to stir or mix substances contained therein. A coupling guide 728 is preferably provided to permit the support rod 724 to be inserted into the sleeve 720 without damaging the sleeve 720. One or more external mixing mechanisms or elements (not shown) is preferably provided and coupled from above to cause the mixing rod 724 and paddle 725 to move within the tank 701.

The tank 701 defines three apertures or ports 705A-705C each having an associated drain connector 100A-100G. Each drain connector 100A-100C has a flange 150A-150C and plunger (with the sealed end 111A-111C of each plunger labeled in FIG. 9), an associated inlet/outlet tube 50A-50C, and a coupling 149A-149C associated with the inlet/outlet tube 50A-50C. The combination of the tank 701, sleeve 720 and contents 724, 725, and drain connectors 100A-100G may be termed a processing receptacle 700. In operation of the receptacle 700, substances are supplied to the tank 701 through, e.g., the upper drain connectors 100B, 100G, which may be opened for as long or short a period as desired and/or intermittently operated if desired. Substances are then processed within the tank 701. Following any processing steps, a drain connector, e.g., the lower drain connector 100A, may be opened to permit processed substances to exit the tank 701.

Figure 10A:
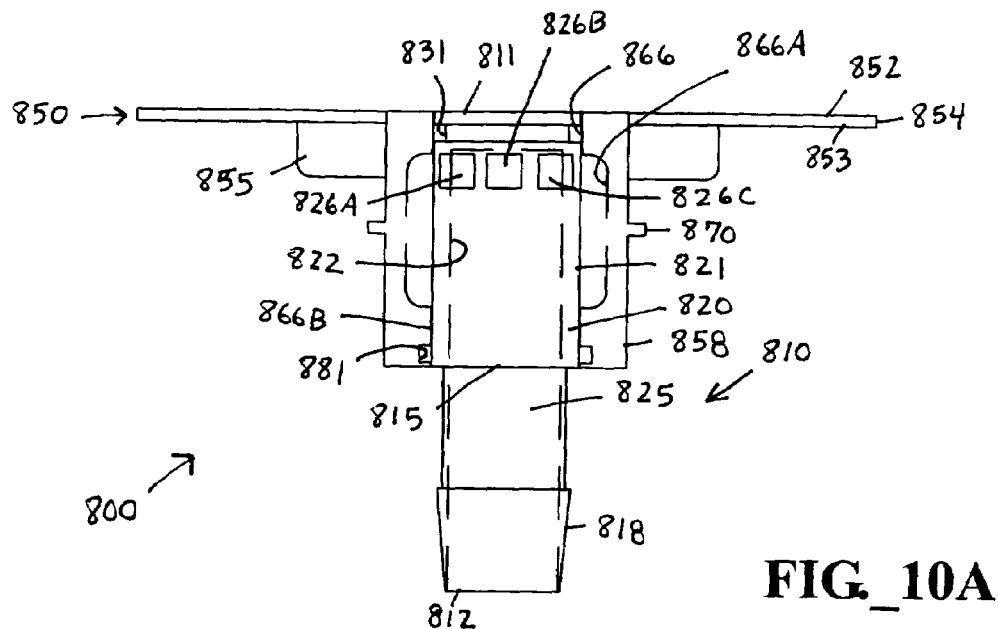
FIG. 10A is an elevation view of a hollow plunger and drain flange of a drain connector in a closed state according to another embodiment of the present invention, with interior voids within the plunger and drain represented in shadowed lines.
Figure 10B:
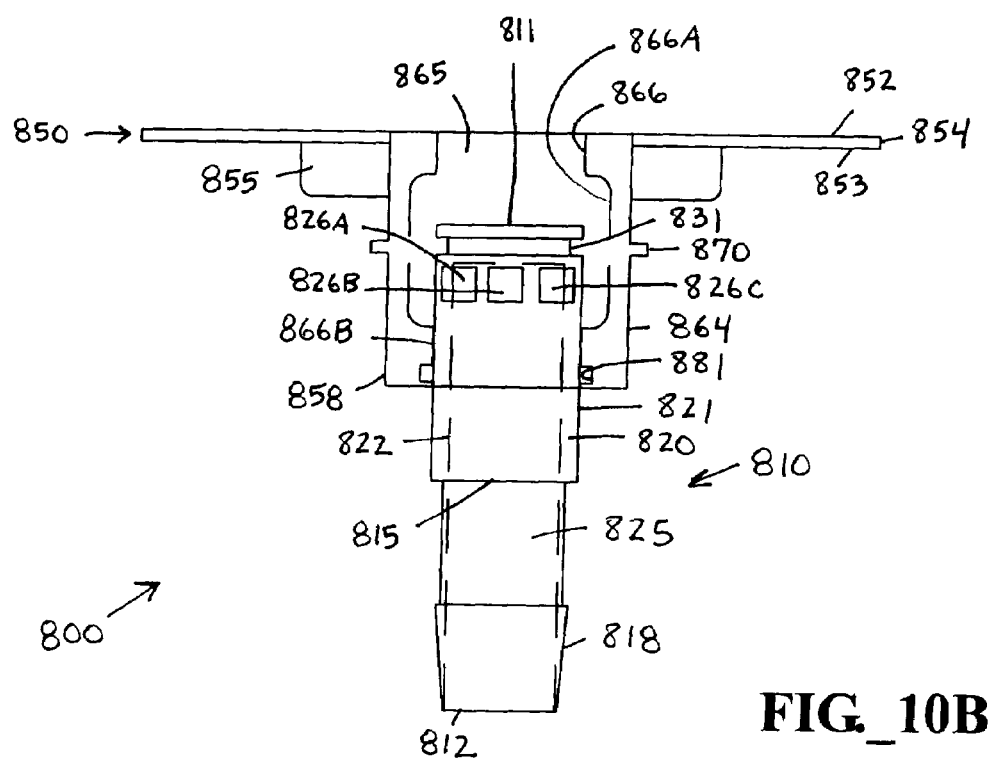
FIG. 10B illustrates the same view as FIG. 10A, but with the drain connector in an open state.

A drain connector 800 according to another embodiment is shown in FIGS. 10A-10B. Rather than being actuated by pressing a plunger outward from a flange in the direction of the associated tank or bank, this drain connector 800 is actuated by withdrawing the plunger 810 into the flange 850 in the direction away from the associated tank or bag (not shown). FIG. 10A shows the connector 800 in a closed state, while FIG. 10B shows the connector 800 in an open state. The hollow plunger 810 has a body 815, a first closed end 811, a second open end 812, and a wall 820 with an exterior surface 821 and an interior surface 822 defining a hollow core 825 leading to or open to the open end 812. Multiple passages 826A-826C are defined through the wall 820 and extend from the exterior surface 821 into the hollow core 825. The exterior surface 821 of the wall 820 further defines a circumferential recess 831 adjacent to the passages 826A-826C, with the recess 831 preferably being sized and shaped to retain an O-ring or equivalent sealing element. (For the sake of simplicity, sealing elements, which would fit into the recess 831 defined in the plunger 810, and into the recess 881 defined in the flange 850, have been omitted from FIGS. 10A-10B, but it is to be understood that sealing elements are preferably provided.) At the opposite end of the plunger 810, the plunger body 815 preferably includes a tapered neck portion 818 intended to mate with an outlet tube.

The flange 850 includes a flange lip 851 having an upper surface 852, a lower surface 853, and a peripheral edge 854. The flange lip 851 extends outward from the flange body 855. The flange body 855 defines an aperture 865 having a first portion bounded by an inner sealing surface 866 and a second, enlarged portion bounded by an inner recess surface 866A. The first portion bounded by the inner sealing surface 866 preferably has substantially constant interior dimensions to permit the plunger 810 to slide freely therein, with the O-ring (not shown) retained in the circumferential recess 831 contacting the inner surface 866. The flange body 855 includes an outer surface 864 with a retaining lip 870 protruding therefrom. The flange body 855 further includes a lower body surface 858 that is preferably annular in shape surrounding the aperture 865.

When the drain connector 800 is in the closed state (shown in FIG. 10A), sealing engagement between the sealing elements (not shown) fitted into the circumferential recess 831 and the inner sealing surface 866 prevents the passage of any substances from the tank (not shown) into the hollow core 825. When the drain connector 800 is in the open state (as shown in FIG. 10B), substances (e.g., contents of a tank) are permitted to flow into the aperture 865 and through the passages 826A-826C into the hollow core 825 to exit the drain connector 800. Leakage between the flange 850 and plunger 810 is prevented by sealing engagement between a sealing element (not shown) fitted or otherwise provided in the recess 881 defined along a lower inner surface portion 866B of the flange. Thus, drain connector 800 includes two circumferential seals between the plunger 810 and the flange 850, with the passages 826A-826C leading to the hollow core 825 being disposed between the seals.

Processing receptacles including drain connectors coupled to processing tanks and/or bags all as described herein may be put to various desirable uses. In one embodiment, such a processing receptacle may be used to mix and/or react industrial chemicals. In a first method step, at least one material is to a processing receptacle as described herein. In a second method step, the at least one material is processed within the receptacle. In a third method step, the at least one processed material is drained from the receptacle through a drain connector as described herein. In an optional method step, one or more materials may be supplied to the receptacle through the drain connector prior to the draining step. Such a step may include the supply of a gas such as oxygen or air to assist in aerating or facilitating a chemical reaction of materials disposed within the receptacle.

In another embodiment, a processing receptacle as described herein may be used to assist in pharmaceutical development, formulation, or manufacture. In a first method step, at least one material selected from: drug precursor materials, therapeutic agents, binding materials, bulk materials, coloring agents, flavoring agents, stabilizing agents, preservatives, and reagents is added to a processing receptacle. In a second method step, the at least one material is processed (e.g., mixed and/or reacted) within the receptacle. In a third method step, the at least one processed material is drained from the receptacle through a drain connector as described herein. In an optional method step, one or more materials (e.g., including gases) may be supplied to the receptacle through the drain connector prior to the draining step.

In another embodiment, a processing receptacle as described herein may be used to process biological materials. In a first method step, at least one of various biological materials is added to a processing receptacle. Non-biological materials may also be added if desired for a particular application. In a second method step, the at least one biological material is processed (e.g., mixed, reacted, and/or fermented) within the receptacle. In a third method step, the at least one processed material is drained from the receptacle through a drain connector as described herein. In an optional method step, one or more materials (e.g., including gases) may be supplied to the receptacle through the drain connector prior to the draining step.

In another embodiment, a processing receptacle as described herein may be used to process semiconductor precursor and/or processing materials. For example, wet solutions may be combined with abrasive materials to yield chemical mechanical polishing or planarization (CMP) slurries. In a first method step, at least one semiconductor precursor and/or processing material is added to a processing receptacle. In a second method step, the at least one semiconductor precursor and/or processing material is processed within the receptacle. In a third method step, the at least one processed material is drained from the receptacle through a drain connector as described herein. In an optional methods step, one or more materials (e.g., including gases) may be supplied to the receptacle through the drain connector prior to the draining step.

While the invention has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A selectively closeable drain connector arranged for mounting to a tank or bag, the drain connector comprising:
   a plunger including a plunger body having a first closed end, a second open end, a wall with an exterior surface and with an interior surface bounding a hollow core, and a first and a second circumferential sealing element disposed along the exterior surface, the plunger body further defining at least one passage extending from the exterior surface into the hollow core and disposed between the first and the second circumferential sealing element; and
   a drain flange defining an aperture adapted to receive the plunger, the aperture being bounded by an inner surface adapted to sealingly engage the first and the second circumferential sealing element when the drain connector is in a closed state, and to sealingly engage the second circumferential sealing element when the drain connector is in an open state;
   wherein any of the plunger and the flange is adapted to move relative to the other; and
   wherein the drain connector is characterized by any one or more of the following:
   (i) the drain flange has a radially extending flange lip adapted for placement against a bottom wall of said tank or bag, and the first sealed end of the plunger is disposed substantially flush against an upper surface of said radially extending flange lip when said drain connector is in a closed state; and
   (ii) a portion of the plunger is arranged to travel into an interior volume of said tank or bag when said drain connector is in an open state.

2. The drain connector of claim 1 wherein a perimeter of at least a portion of the plunger body is substantially circular in shape.

3. The drain connector of claim 1 wherein the plunger further comprises at least one travel stop.

4. The drain connector of claim 3 wherein the at least one travel stop comprises an externally flared portion disposed along the first closed end of the plunger.

5. The drain connector of claim 3 wherein the at least one travel stop comprises a raised tab or raised ring disposed along the exterior surface of the plunger body.

6. The drain connector of claim 1 wherein each of the first and the second circumferential sealing element has an associated circumferential recess defined in the exterior surface of the plunger body wall, and each of the first and the second circumferential sealing element comprises an O-ring adapted to fit into its associated circumferential recess.

7. The drain connector of claim 1 wherein any of the first and the second circumferential sealing element comprises a raised sealing ring fitted to or integrally formed with the plunger.

8. The drain connector of claim 1, further comprising a hollow outlet tube engaged to the plunger along the open end.

9. The drain connector of claim 1 wherein the drain connector is actuated from an open state to a closed state or vice-versa by motion of the outlet tube.

10. The drain connector of claim 1 wherein the at least one passage comprises a plurality of passages.

11. A hollow processing tank comprising the drain connector of claim 1.

12. The tank of claim 11 wherein the tank is fabricated of a substantially optically transmissive material.

13. The tank of claim 11, further comprising a processing bag fabricated of a substantially non-rigid material, wherein the bag is disposed substantially within the tank and the drain flange is sealingly engaged to the bag.

14. The tank of claim 13, wherein the sealing engagement between the drain flange and the bag is non-permanent and adapted to permit removal of the drain flange.

15. The tank of claim 14, further comprising at least one O-ring disposed between any of: (1) the drain flange and the bag, and (2) the bag and the tank.

16. The tank of claim 11, further comprising a moveable mixing element disposed within the tank.

17. A material processing bag having an outer wall comprising a polymeric film material, wherein said bag further comprising the drain connector of claim 1 sealingly engaged thereto.

18. The bag of claim 17 wherein the bag and the drain connector are sterilized.

19. The bag of claim 17 wherein said polymeric film is a substantially optically transmissive.

20. The bag of claim 17, further comprising a moveable mixing element disposed within the bag.

21. The drain connector of claim 1 wherein the drain flange comprises a substantially optically transmissive material.

22. The drain connector of claim 1, further comprising a sensor affixed to any of the plunger, the drain flange, and an outlet tube associated with any of the plunger and the drain flange, wherein the sensor is adapted to monitor at least one characteristic of a substance contained or flowing within the drain connector.

23. A method for fabricating a sterile processing receptacle, the method comprising the steps of:
   providing a hollow container;
   providing a selectively closeable drain connector comprising:
      a hollow plunger including a plunger body having a first closed end, a second open end, a wall with an exterior surface and with an interior surface bounding a hollow core, a first and a second circumferential sealing element disposed along the exterior surface, and a travel stop, the plunger body further defining at least one passage extending from the exterior surface into the hollow core and disposed between the first and the second circumferential sealing element; and
      a drain flange defining an aperture adapted to receive the plunger, the aperture being bounded by an inner surface adapted to sealingly engage the first and the second circumferential sealing element when the drain connector is in an open state, and to sealingly engage the second circumferential sealing element when the drain connector is in a closed state;
      wherein any of the plunger and the flange is adapted to move relative to the other; and
      wherein the drain connector is characterized by any one or more of the following:

(i) the drain flange has a radially extending flange lip adapted for placement against a bottom wall of said tank or bag, and the first sealed end of the plunger is disposed substantially flush against an upper surface of said radially extending flange lip when said drain connector is in a closed state; and (ii) a portion of the plunger is arranged to travel into an interior volume of said tank or bag when said drain connector is in an open state; and joining the drain connector to the hollow container to form a fluid processing receptacle; and sterilizing the fluid processing receptacle.

24. The method of claim 23, further comprising the step of packaging the sterile fluid processing receptacle in a sealed package.

25. The method of claim 23, wherein the hollow container comprises any of a hollow bag and a hollow tank.

26. A selectively closeable drain connector arranged for mounting to a tank or bag, the drain connector comprising:

a hollow plunger including a plunger body having a first closed end, a second open end, a wall with an exterior surface and with an interior surface bounding a hollow core, and a first circumferential sealing element disposed along the exterior surface, the plunger body further defining at least one passage extending from the exterior surface into the hollow core and disposed adjacent to first circumferential sealing element; and a drain flange defining an aperture adapted to receive the plunger, the aperture being bounded by an inner surface adapted to sealingly engage the first circumferential sealing element when the drain connector is in a closed state, the drain flange further including a second sealing element adapted to sealingly engage a portion of the exterior surface of the plunger when the drain connector is in an open state and when the drain connector is in a closed state;

wherein any of the plunger and the flange is adapted to move relative to the other; and wherein the drain connector is characterized by any one or more of the following:

(i) the drain flange has a radially extending flange lip adapted for placement against a bottom wall of said tank or bag, and the first sealed end of the plunger is disposed substantially flush against an upper surface of said radially extending flange lip when said drain connector is in a closed state; and (ii) a portion of the plunger is arranged to travel into an interior volume of said tank or bag when said drain connector is in an open state.

27. A selectively closeable drain connector arranged for mounting to a tank or bag, the drain connector comprising:

a hollow plunger including a plunger body having a first closed end, a second open end, and a wall with an exterior surface and with an interior surface bounding a hollow core, the plunger body further defining at least one passage extending from the exterior surface into the hollow core; and a drain flange defining an aperture bounded by an inner surface and adapted to receive the plunger, the inner surface having a first and a second raised sealing element, wherein, when the drain connector is in a closed state, the at least one passage is disposed between the first and the second raised sealing element and each of the first and the second raised sealing element sealingly engage the exterior surface of the plunger;

wherein any of the plunger and the flange is adapted to move relative to the other; and wherein the drain connector is characterized by any one or more of the following:

(i) the drain flange has a radially extending flange lip adapted for placement against a bottom wall of said tank or bag, and the first sealed end of the plunger is disposed substantially flush against an upper surface of said radially extending flange lip when said drain connector is in a closed state; and (ii) a portion of the plunger is arranged to travel into an interior volume of said tank or bag when said drain connector is in an open state.

28. The drain connector of claim 1, wherein the drain flange has a radially extending flange lip adapted for placement against a bottom wall of said tank or bag, and the first sealed end of the plunger is disposed substantially flush against an upper surface of said radially extending flange lip when said drain connector is in a closed state.

29. The drain connector of claim 1, wherein a portion of the moveable plunger is arranged to travel into an interior volume of said tank or bag when said drain connector is in an open state.

30. The drain connector of claim 29, wherein the first circumferential sealing element is disposed along an upper portion of the plunger and is arranged to travel into an interior volume of said connector when said drain connector is in an open state.

31. A hollow processing tank having disposed therein the material processing bag of claim 17.

32. The tank of claim 31, further comprising at least one O-ring disposed between any of: (1) the drain flange and the bag, and (2) the bag and the tank.

* * * * *

UNITED STATES PATENT AND TRADEMARK OFFICE
CERTIFICATE OF CORRECTION

PATENT NO. : 7,614,607 B2  Page 1 of 1
APPLICATION NO. : 11/522679
DATED : November 10, 2009
INVENTOR(S) : Sven Stiers It is certified that error appears in the above-identified patent and that said Letters Patent is hereby corrected as shown below:

Column 11, line 8: "100A-100G" should be -- 100A-100C --.

Column 11, line 14: "100A-100G" should be -- 100A-100C --.

Column 11, line 17: "100G" should be -- 100C --.

Signed and Sealed this

Ninth Day of March, 2010

David J. Kappos
*Director of the United States Patent and Trademark Office*